United States Patent
Reynolds et al.

(10) Patent No.: US 7,778,856 B2
(45) Date of Patent: Aug. 17, 2010

(54) SYSTEM AND METHOD FOR MEASURING AND MANAGING OPERATIONAL RISK

(75) Inventors: Diane Reynolds, London (GB); Dan Rosen, Toronto, CA (US); David Syer, London (GB)

(73) Assignee: Algorithmics International Corp., Bridgetown, West Indes (BB)

( * ) Notice: Subject to any disclaimer, the term of this patent is extended or adjusted under 35 U.S.C. 154(b) by 0 days.

(21) Appl. No.: 12/365,961

(22) Filed: Feb. 5, 2009

(65) Prior Publication Data

US 2009/0138309 A1  May 28, 2009

Related U.S. Application Data

(62) Division of application No. 10/310,147, filed on Dec. 5, 2002, now abandoned.

(30) Foreign Application Priority Data

Dec. 5, 2001  (CA)  .................................. 2364425

(51) Int. Cl.
G06F 9/44 (2006.01)
(52) U.S. Cl. ................ 705/7; 705/10; 705/37; 705/38; 273/256
(58) Field of Classification Search .................. None
See application file for complete search history.

(56) References Cited

U.S. PATENT DOCUMENTS

| | | | | |
|---|---|---|---|---|
| 5,930,762 | A * | 7/1999 | Masch ............................ | 705/7 |
| 6,817,613 | B2 * | 11/2004 | Hasek ........................ | 273/256 |
| 6,912,502 | B1 * | 6/2005 | Buddle et al. ................ | 705/1.1 |
| 7,006,992 | B1 * | 2/2006 | Packwood .................... | 705/38 |
| 7,113,914 | B1 * | 9/2006 | Spielmann et al. ............. | 705/7 |
| 7,171,385 | B1 * | 1/2007 | Dembo et al. ............. | 705/36 R |
| 7,231,327 | B1 * | 6/2007 | Beverina et al. ................ | 703/2 |
| 7,305,351 | B1 * | 12/2007 | Bechhofer et al. ............. | 705/7 |
| 7,308,388 | B2 * | 12/2007 | Beverina et al. ................ | 703/6 |
| 7,401,057 | B2 * | 7/2008 | Eder ........................... | 706/20 |
| 7,447,977 | B2 * | 11/2008 | Bauer et al. ................. | 714/774 |
| 7,590,589 | B2 * | 9/2009 | Hoffberg ..................... | 705/37 |
| 2001/0011243 | A1 | 8/2001 | Dembo et al. | |
| 2002/0059093 | A1 * | 5/2002 | Barton et al. ................. | 705/10 |

(Continued)

OTHER PUBLICATIONS

Lorance, Randal B.. (1992). Contingency Draw-Down Using Risk Analysis. American Association of Cost Engineers. Transactions of the American Association of Cost Engineers, 1, F.6.1.*

(Continued)

*Primary Examiner*—Romain Jeanty
*Assistant Examiner*—Gurkanwaljit Singh
(74) *Attorney, Agent, or Firm*—Katten Muchin Rosenman LLP

(57) ABSTRACT

According to one aspect of the invention, there is provided a method of modeling operational risk comprising the steps of: defining one or more reporting hierarchies, wherein said reporting hierarchies are composed of operational units; associating operational risk data to one or more of said operational units, wherein said operational risk data includes data associated with a plurality of first loss events; and calibrating a plurality of loss processes and a plurality of loss process attributes using said plurality of first loss events, wherein a plurality of loss processes are generated for use in at least one of risk management, operations management, and financial management.

18 Claims, 6 Drawing Sheets

U.S. PATENT DOCUMENTS

| | | | |
|---|---|---|---|
| 2003/0149657 A1* | 8/2003 | Reynolds et al. | 705/38 |
| 2003/0178769 A1* | 9/2003 | Hasek | 273/256 |
| 2004/0225629 A1* | 11/2004 | Eder | 706/46 |
| 2005/0096950 A1* | 5/2005 | Caplan et al. | 705/7 |
| 2005/0119959 A1* | 6/2005 | Eder | 705/36 |
| 2008/0027769 A1* | 1/2008 | Eder | 705/7 |
| 2008/0027841 A1* | 1/2008 | Eder | 705/35 |
| 2009/0018891 A1* | 1/2009 | Eder | 705/10 |

OTHER PUBLICATIONS

Berny, Jan (1988). Forecasting and Risk Analysis Applied to Management Planning and Control. Ph.D. dissertation, Aston University (United Kingdom), England.*

Parry, Mike. (1977, Jan.). Subjective Probability and the Concept of Risk in Project Appraisal. Accountancy, 88(1001), 119.*

Eric R Ziegel. (2000). Introduction to Simulation and Risk Analysis. Technometrics, 42(2), 220.*

Ormon, Stephen Wayne (2002). Development of a hierarchical, model-based design decision-support tool for assessing uncertainty of cost estimates. M.S. dissertation, Mississippi State University, United States.*

Randal B Lorance, & Robert V Wendling. (2001). Basic techniques for analyzing and presentation of cost risk analysis. Cost Engineering, 43(6), 25-31.*

Prasanta Kumar Dey. (2001). Decision support system for risk management: A case study. Management Decision, 39(8), 634-649.*

Luke T Miller, & Chan S Park. (2002). Decision making under uncertainty—real options to the rescue? The Engineering Economist, 47(2), 105-150.*

Reid, Katharine (2000). Risk-e-business: A framework for legal risk management developed through an analysis of selected legal risk in Internet commerce. Ph.D. dissertation, University of New South Wales (Australia), Australia.*

Basel Committee on Banking Supervision, "Consultative Document Operational Risk", May 2001, p. 1-26.

Basel Committee on Banking Superviison, "Working Paper on the Regulatory Treatment of Operational Risk", Sep. 2001, p. 1-35.

Basel Committee on Banking Superviison, "The Quantitative Impact Study for Operational Risk: Overview of Individual Loss Data and Lessons Learned", Jan. 2002, www.bis.org, p. 1-26.

BBA, "BBA Operational Risk Database (1)", Jul. 2000, www.bba.org.uk.

BBA, "BBA Operational Risk Database (2)", Jul. 2000, www.bba.org.uk.

Bucay, Nisso et al., "Applying Portfolio Credit Risk Models to Retail Portfolios", Algo Research Quarterly, Mar. 2000, vol. 3, No. 1, p. 45-73.

Coleman, Rodney, "Operational Risk Measurement and Pricing", Derivatives Week, Jul. 1999, http://stats.ma.ic.ac.us/~rcoleman/opriskLCV.html.

Dembo, Ron et al., "Mark to Future a Framework for Measuring Risk and Reward", May 2000, Algorithmics Publications, Toronto, Canada.

Frachot, A. et al., "Loss Distribution Approach for Operational Risk", Apr. 2001, Credit Lyonnais, http://gro.creditlyonnais.fr, p. 1-43.

Frey, Rüdiger et al., "Modeling Dependent Defaults: Asset Correlations Are Not Enough!", Mar. 2001, www.math.ethz.ch/mcneil, p. 1-8.

Haubenstock, Michael, "Loss Data: Statistical/Actuarial Approaches to Operational Risk Capital", Operational Risk, Dec. 2000, p. 14-17.

Kaiser, Dr. Thomas, "The Quantative Methods of Operational Risk", Commerzbank, 2001, p. 2-24.

King, Jack L., "Defining Operational Risk", Algo Research Quarterly, Dec. 1998, vol. 1, No. 2, p. 37-42.

Lawrence, Mark, "Marking the Cards at ANZ", Nov. 2000, www.financewise.com.

Lawrence, Mark, "Weighing the Dragon: Operational Risk Measurement at ANZ (Part II—Building the Tools)", Operational Risk, Nov. 2000, p. 11-15.

Laycock, Mark, "Developments in Analysing and Quantifying Operational Risk: Analysis of Mishandling Losses and Processing Errors", Operational Risk and Financial Institutions, 1998, p. 131-145.

Medova, Elena, "Measuring Risk by Extreme Values", Risk, Nov. 2000, p. S20-S26.

Medova, Elena, "Extreme Value Theory: Extreme Values and the Measurement of Operational Risk", Operational Risk, Jul. 2000, p. 11-15.

O'Brien, Niall et al., "The Case for Quantification", Risk, Jul. 1999.

Syer, Dave et al., "Quantifying Op Risk: Valuing Operational Risks Using Utility Functions", Operational Risk, Jun. 2000, p. 16-18.

* cited by examiner

SYSTEM AND METHOD FOR MEASURING AND MANAGING OPERATIONAL RISK

This application is a divisional of U.S. patent application Ser. No. 10/310,147, filed Dec. 5, 2002, which claims priority from Canadian 2,364,424, filed Dec. 5, 2001, the contents of both incorporated herein by reference.

FIELD OF THE INVENTION

The present invention relates generally to risk management systems and methods, and is more specifically directed to systems and methods for measuring and managing operational risk.

BACKGROUND OF THE INVENTION

Risk management systems are commonly employed by firms, which may include financial institutions, resource-based corporations, trading organizations, governments, and other users, for example, to make informed decisions in assessing and managing the risks associated with the operations of these users.

In modern financial and regulatory environments, effectively measuring and managing market risk, credit risk and operational risk is vital in the development of a comprehensive risk management system. Many organizations have implemented procedures that successfully address market risk and, to some extent, credit risk. However, managing operational risk presents special challenges, since the sources of data required to measure operational risk are often limited, and since there is a lack of industry-accepted methodologies to measure such risk.

Operational risk is defined as the risk of loss resulting from inadequate or failed internal processes, people, systems or external events. This definition may be extended for non-regulatory purposes to encompass legal risk and strategic risk (i.e. the risk of making a poor business decision). Some of the most important types of operational risk involve breakdowns in internal controls and corporate governance. Such breakdowns can lead to financial losses through error, fraud, or failure to perform (i.e. address risk events) in a timely manner or cause the interests of a financial institution to be compromised in some other way (e.g. staff exceeding their authority or conducting business in an unethical or risky manner). Major publicized losses at financial institutions in recent years illustrate the enormity of loss events resulting from the failure of or non-existence of operational risk management systems. Major losses caused by information technology systems failures, disasters, and rogue trading, for example, have cost financial institutions and firms vast sums of money, diminished shareholder value, and tarnished their reputation with the general public.

Recent studies have suggested that the operational risk exposure in the banking industry is substantial and growing. For instance, KPMG Consulting Inc. published an analysis entitled "Operational Risk Becomes a Capital Problem" (May 10, 2000) which found that operational risk accounts for approximately 40% of a financial institutions overall risk. Reflecting the growing importance of operational risk, the Basle Committee on Banking Supervision (BCBS) has recently established new capital proposals that will require financial institutions to implement robust systems for the collection and monitoring of operational risk data. The BCBS is part of The Bank of International Settlements (BIS), an international organization which fosters international monetary and financial cooperation, and serves as a bank for central banks. The BCBS proposes implementing three new methods for calculating the operational risk capital charge for financial institutions, namely:

(a) Basic Indicator Approach;
(b) Standardized Approach; and
(c) Advanced Measurement Approach (AMA).

Under the Basic Indicator Approach, financial institutions must hold capital for operational risk equal to a fixed percentage of an indicator of size, or risk, such as gross income. Under the Standarized Approach, the required capital for a financial institution as a whole is the aggregate of the required capital amounts for all business lines within the organization, as calculated individually using a similar methodology to the Basic Indicator Approach. The AMA is a more sophisticated method that allows each institution to implement its own measurement method for operational risk. As an incentive for implementing operational risk management systems, BIS has proposed that as financial institutions move from the Basic Indicator method along the continuum of increasingly sophisticated models for calculating the operational risk, they will be rewarded with a lower capital charge. Further, BIS mandates that failure to comply with its new policies will be result in a variety of supervisory actions, including increased oversight, senior management changes, and the requirement of additional capital.

In theory, the desire not to tie up capital should provide a powerful incentive for financial institutions to monitor and reduce operational risk. Despite being aware that operational risk has been increasing in the banking industry, many banks are only in the early stages of developing a framework for measuring and managing operational risk. This reluctance to adopt operational risk management systems may be largely be attributed to the lack of effective risk measurement models and methodologies.

Various approaches have been developed for modeling operational risk. The majority of these models provide only a firm-wide view of operational risk, and are unable to effectively manage risk exposure at the business unit level. For example, the Capital Asset Pricing Model (CAPM) is a top-down model which provides an overview of a firm's operational risk exposure by focusing only on major operational failures (e.g. disasters).

A further hindrance to the development and adoption of operational risk management systems is the limited availability of loss process data. While a growing number of financial institutions are collecting and analyzing operational loss event data, it is clear that there has been no industry standard for the accumulating such data. Such data collection is vital for the assessment of operational risk at individual institutions.

Accordingly, there is a need for a system and method of measuring and managing operational risk that is capable of providing an assessment of risk exposure throughout all levels of a firm. There is a further need for a flexible operational risk management system that can be adapted to support new operational risk capital calculation models and methodologies, and new sources of loss process data, as they appear.

SUMMARY OF THE INVENTION

The present invention relates generally to risk management systems and methods, and is more specifically directed to systems and methods for measuring and managing operational risk. According to a first aspect of the invention, there is provided a system for measuring and managing operational risk, comprising: a database, wherein operational risk data is stored therein, wherein said operational risk data includes data associated with a plurality of first loss events; a first calibration engine coupled to said database, wherein said calibration engine generates a plurality of loss processes, and estimates a plurality of loss process attributes; a second reporting hierarchy engine coupled to said database, wherein said reporting hierarchy engine associates each of said plurality of loss processes to one or more operational units; a third simulation engine connected to said calibration engine for performing simulation-based computations, wherein said third simulation engine forecasts a plurality of second loss events using said plurality of loss processes, wherein said second loss events are estimates of future loss events; and a fourth risk engine coupled to said second reporting hierarchy engine and said third simulation engine for computing at least one risk measure using said plurality of first or said second loss events, wherein said risk measure is a measure of operational risk.

According to another aspect of the invention, there is provided a method of measuring and managing operational risk within a firm, comprising the steps of: defining a plurality of reporting hierarchies, wherein said reporting hierarchies are composed of operational units; associating operational risk data to one or more of said operational units, wherein said operational risk data includes data associated with a plurality of first loss events; defining a plurality of scenarios, wherein said plurality of scenarios include a plurality of loss process attributes; computing a plurality of second loss events using said plurality of loss processes and said plurality of loss process attributes; storing data associated with one or more of said plurality of second loss events in a storage medium; and aggregating said plurality of second loss events to produce at least one risk measure, wherein said risk measure is a measure of operational risk.

According to another aspect of the invention, there is provided a method of modeling operational risk comprising the steps of: defining one or more reporting hierarchies, wherein said reporting hierarchies are composed of operational units; associating operational risk data to one or more of said operational units, wherein said operational risk data includes data associated with a plurality of first loss events; and calibrating a plurality of loss processes and a plurality of loss process attributes using said plurality of first loss events, wherein a plurality of loss processes are generated for use in at least one of risk management, operations management, and financial management.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF THE INVENTION

The present application claims priority from Canadian Patent Application No. 2,364,425, the contents of which are herein incorporated by reference.

Figure 1:
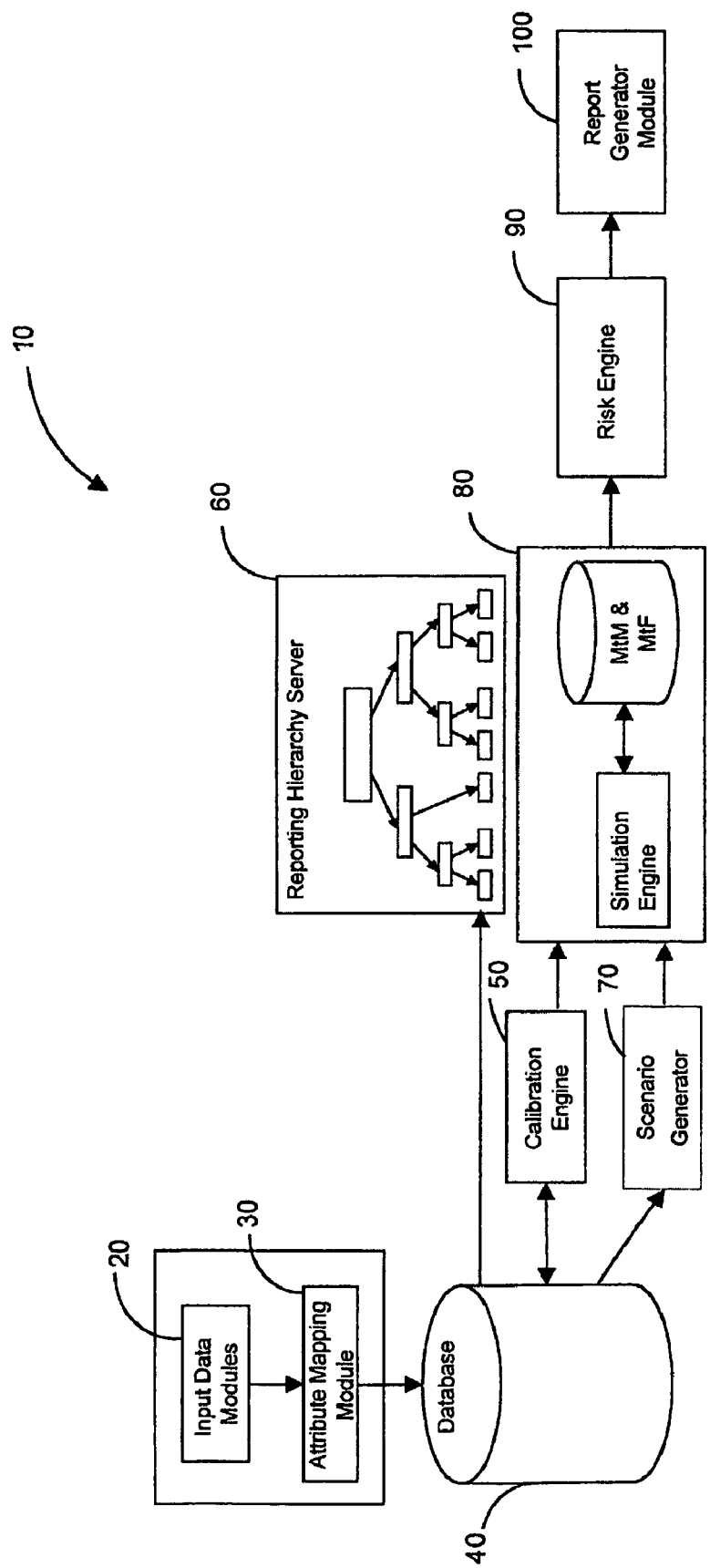
FIG. 1 is a schematic diagram illustrating a system for valuing and managing operational risk in an embodiment of the present invention.

Referring to FIG. 1, a schematic diagram of a system for measuring and managing operational risk capital in an embodiment of the present invention is shown generally as 10.

System 10 comprises a set of integrated components in modular form used to provide for the hierarchical structuring, Mark-to-Future (MtF) valuation, simulation and risk management, and reporting of operational risk capital based on a variety of loss processes. Operational risk capital is typically defined as the regulatory capital amount that a firm must maintain to sufficiently absorb losses resulting from the failure of internal systems, people or external events, for example, so as not to cause a financial collapse and/or disrupt the orderly functioning of financial markets. Operational risk capital may also have an internal aspect which would allow a firm to assess and manage its operational risk exposure.

System 10 comprises a set of input data modules 20 and attribute mapping modules 30 to support the loading and managing of large volumes of data. Input data modules 20 receive loss event data and related information from a variety of sources, including, for example, manual input through a computer keyboard or web-browser interfaces. The data received by input data modules 20 may be in various formats, including, for example, text files, spreadsheets and web-based interfaces.

Attribute mapping modules 30 may be used to convert information obtained from input data modules 20 into a consistent format for storage in database 40. For example, data may be mapped into a desired format and used to create text files with a prescribed layout that can be read by standard database block copy tools Database 40 may be used to store various data types, including, for example, internal loss events, indicators, internal near-miss events, scenarios, external consortium losses, and external public domain losses (to be described in further detail with reference to FIG. 5). It will be obvious to those skilled in the art that data to be stored in database 40 may exist in a single database or other storage means, or distributed across multiple databases or other storage means. Database 40 may be a known relational database, as manufactured by Oracle and Sybase, for example.

Additionally, database 40 may have a canonical structure comprising, for example:

(a) event tables (e.g. loss amount, monetary amount, data, event identification);

(b) classification structure (e.g. name, node identification, parent identification);

(c) join tables linking events and classifications (i.e. node identification, event identification); and/or (d) Foreign exchange rates (monetary amounts, value, date).

Alternatively, the present invention may utilize object-oriented databases, wherein the loss events, reporting hierarchies and foreign exchange rates are stored as objects. Other databases as known in the art may also be used.

Database 40 is used to input and extract the operational risk data and reporting hierarchy information into a calibration engine 50. Generally, reporting hierarchies are representations of the physical or logical structure of a firm. Most firms are already logically or physically organized in a hierarchical structure for risk reporting and management purposes, which may make the task of defining operational units in implementing the present invention less complicated. Reporting hierarchies within a firm may be defined according to the firm's physical units (e.g. trading desks), geographic locations (e.g. regional offices), reporting lines, generic organizational units, or risk classes, for example. Risk class-based reporting hierarchies may also be structured according to "event-based" or "effect-based" categorizations. Input data obtained from external data sources is also often structured in a hierarchical manner, and can be easily incorporated into the subject firm's reporting hierarchy along side internal input data.

The calibration engine 50 uses the input data and reporting hierarchy information from the database 40 to determine an appropriate set of loss processes. In the simplest case, this is done by bucketing (i.e., grouping) all available data associated with each node of a reporting hierarchy (operational unit), then examining the data within each bucket. More complex methods are also used. For example, when two (or more) reporting hierarchies are to be used simultaneously, it is the pair-wise combination of leaf nodes of the hierarchies that determines a set of initial data buckets. A leaf node is an operational unit with no child units; for example in FIG. 5, leaf nodes are 154, 158, 160 and in FIG. 6 leaf nodes are 164, 166, 168, 170.

Beyond the reporting hierarchy analysis, loss processes may be determined using knowledge of real-world processes (e.g., trade settlement) or statistical data analysis.

A loss process is a model that can produce or describe a set of hypothetical future loss events. A loss event is an occurrence having a quantifiable financial impact on a firm (e.g. a monetary loss). A future loss event is a plausible or possible loss event that has not or will not necessarily occur in the future. A loss process may be modeled using a frequency distribution (number of events) and severity distribution (size of event), or using a complete loss distribution (total losses over a specified period) or in other ways. Typically the first approach, referred to as an actuarial model, is used. For ease of discussion, this approach is discussed herein since it is the most common. Actuarial models are typically designed to produce loss distributions which estimate the expected value of one or more economic variables, such as would be generated by loss processes, that are distributed in a random manner. A characteristic of a typical actuarial model is that the annual loss is not a single loss caused by a single event, but is the result of the aggregation of a number of losses.

A variety of parametric and non-parametric distributions may be used to determine the frequency and severity distribution models. Table 1 contains a list of possible frequency and severity actuarial models which may be used by calibration engine 50 to produce the loss distributions:

TABLE 1

Frequency and Severity Distributions

| Frequency Distributions | Severity Distributions |
| --- | --- |
| Poisson | Normal |
| Binomial | Lognormal |
| Bernoulli | Student's t |
| User Defined | Non-parametric |
| Non-parametric (correlated) | Dirac Delta |

Possible non-parametric distributions which may be used by calibration engine 50 include, for example, various histogram or bucketed representations, or a simple resampling of the input data.

Calibration engine 50 may present a user with a list of possible models and allow the user to select one or more models to be used in the calibration process. Alternatively, calibration engine 50 may also permit a user to add additional actuarial models and/or distributions to system 10 by, for example, specifying a discrete distribution function, or by creating a Visual Basic or C++ module that is used by calibration engine 50.

Once the set of loss processes and distributions for the frequency and severity of each loss process have been selected, calibration engine 50 utilizes a "fitting method" to calibrate the models. Note that if an actuarial model is not used, the steps of choosing one or more distributions and then calibrating proceed in the same fashion. Fitting methods are used to compare the frequency results from actuarial loss distributions to the expected frequencies of theoretical statistical distributions, such as a Chi-square goodness of fit test. Alternatively, calibration engine 50 may utilize more sophisticated fitting methods as known in the art, such as the Maximum Likelihood and Bayesian methods, for example.

Given the limited supply of operational risk data in financial and business markets, it is usually not possible to calibrate loss process data using mark-to-market methods. In order to assess whether the loss processes are adequate, it is beneficial to provide the user with feedback regarding the "level of fit" of the selected models. Calibration engine 50 is capable of providing goodness of fit feedback (e.g. statistical ratios, graphical representations) to a user. The user then can use this feedback to decide whether the level of fit of the selected models to the loss process data is acceptable.

The definition, sorting, and aggregation of different reporting hierarchies across business units, geographic locations, industries, instruments, risk classes, regulatory requirements, or other sorting criteria are performed by a reporting hierarchy engine 60.

Scenario generator module 70 is used to generate a plurality of scenarios, collectively known as a scenario set. The number of scenarios must be large enough to provide an acceptable statistical representation of the model. In practice, scenario sets typically contain thousands of scenarios. A scenario is a hypothetical value for an attribute of a loss process that may occur during a given risk time horizon. An attribute of a loss process may include the frequency of loss events per risk time horizon or the average severity of such a loss event, for example. A scenario is typically the realization of a set of random variables representing attributes of a loss process. Alternatively, a scenario may be the value of one or more independent risk factors that can be used to infer the value of an attribute of a loss process.

Subsequent output from calibration engine 50, reporting hierarchy engine 60, and scenario generator module 70 may be stored in database 40, to be used by simulation engine 80. Simulation engine 80 may use scenario sets having loss processes with attributes or risk factors to generate scenarios of loss events. Scenarios of loss events may be a set of loss events experienced in a given risk time horizon by modeling a plurality loss processes according to the model specified by the user in the calibration engine 50. For example, for a risk time horizon of one year, the unit of simulation is the sum of losses for the period of one year. In practice, any risk horizon may be used, however, the one year period is commonly used by risk managers in measuring and managing credit and operational risk. Simulation engine 80 performs the following steps for each loss process in the reporting hierarchy:

1. Simulate the number of loss events in each of the scenarios, and where applicable, each time horizon (i.e. the frequency, n).
2. Sample from the distribution of absolute loss amounts, the result being a set of n losses as indicated in the scenario.
3. Sum the losses to form the (simulated) loss at each time horizon for each scenario.
4. Collect and analyze the simulated losses to provide risk measures (e.g. the largest expected loss every hundred years).

The output from simulation engine 80, such as MtF valuations, may be stored in directly database 40 or in a temporary data storage medium.

Outputs from simulation engine 80 and reporting hierarchy engine 60 are provided to risk engine 90. Risk engine 90 is used to determine loss distributions and risk measures associated with each loss process, and with each operational unit in a reporting hierarchy. The risk measures can be used to support decision-making and the management of operational risk, and may include, for example, expected loss, unexpected loss at a confidence level, value-at-risk (VaR) at a confidence level, marginal VaR at a confidence level, measures of frequency and severity of loss events, and arrival times of loss events. Risk engine 90 may also be programmed to perform real-time "what-if" scenario simulations for new and existing loss process data.

Output from risk engine 90 may be stored in database 40, and may be used to generate reports using report generator 100. Report generator 100 can be used to define and generate standard and/or user-defined reports. Report generator 100 is able to query databases (e.g. database 40), extract values directly from the risk engine 90, and utilize functions of the reporting hierarchy server 60 (e.g. assigning the loss distribution results to specific units in the reporting hierarchy) Report generator 100 may be a standard database reporting tool, such as Crystal Decision's "Crystal Reports" application, for example. In a preferred embodiment of the present invention, report generator 100 may create user reports that enable the user to "drill down" or incrementally review each level within a reporting hierarchy. Additionally, report generator 100 is capable of producing and reporting risk measures internally based on more than one reporting hierarchy.

The present invention may be implemented in systems designed to provide distributed, desktop capabilities to support firm-wide operational risk management. Such systems are also preferably designed to be computationally efficient and scalable to the largest hierarchical firm structures and loss processes. In preferred embodiments of invention, the systems comprise analysis and reporting tools that include the ability to attribute the marginal operational risks and capital contributions of each constituent unit (i.e. departments, trading desks) to the firm-wide regulatory and/or internal capital amount. When calibrated to a set of loss processes, the system may compute MtF operational risk capital valuations for known and hypothetical loss processes. The system may be adapted to support new operational risk capital calculation models and methodologies, and new sources of loss process data, as they appear.

Application to a Mark-to-Future Methodology

As indicated with reference to FIG. 1, system 10 can be adapted to generate MtF data for use in simulation and risk management applications, both by components within system 10 of the present invention, and external applications. MtF data can be generated from the output of various components of system 10, including reporting hierarchy engine 60, and scenario generator module 70. In an application of the present invention to the MtF framework, reporting hierarchy server 60 can work in parallel to produce a variant of the standard MtF Cube for use in the context of operational risk.

Figure 2:
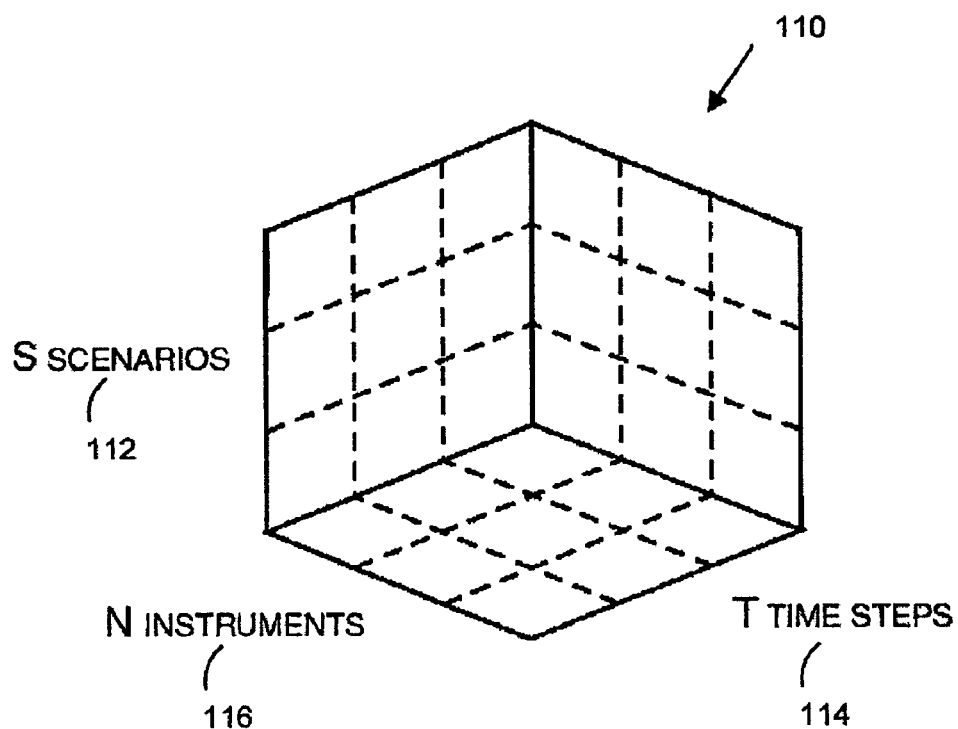
FIG. 2 is diagram illustrating a standard Mark-to-Future (MtF) Cube.

The generation of the standard MtF Cube is at the core of the MtF framework. Key to the MtF framework is the premise that knowledge of portfolio holdings is not required to generate a MtF Cube: a single MtF Cube accommodates the risk/reward assessment of multiple portfolios simultaneously. FIG. 2 illustrates an example of a standard MtF Cube, shown generally as 110, comprising of a set of scenarios 112, time steps 114, and instruments 116 (e.g. loans). For market and credit risk systems, the MtF framework creates an instrument MtF Cube containing all of the necessary information about the values of individual instruments. All market and credit risk/reward analyses and portfolio dynamics for any set of holdings can be derived by post-processing the contents of the MtF Cube. Further details on the Mark-to-Future Cube can be found in Dembo et al., *Mark-to-Future: A Framework for Measuring Risk and Reward* (Toronto: Algorithmics Publications, 2000), the contents of which are herein incorporated by reference. An example of an implementation of this method and why it represents a standard for simulation-based risk/reward measurement and management can be found in pending U.S. patent application Ser. No. 09/811,684, the contents of which are herein incorporated by reference. Mark-to-Future is a framework designed not merely to measure risk and reward, but also to manage the trade-off of risk and reward.

Mark-to-Future Methodology for Operational Risk

Figure 3:
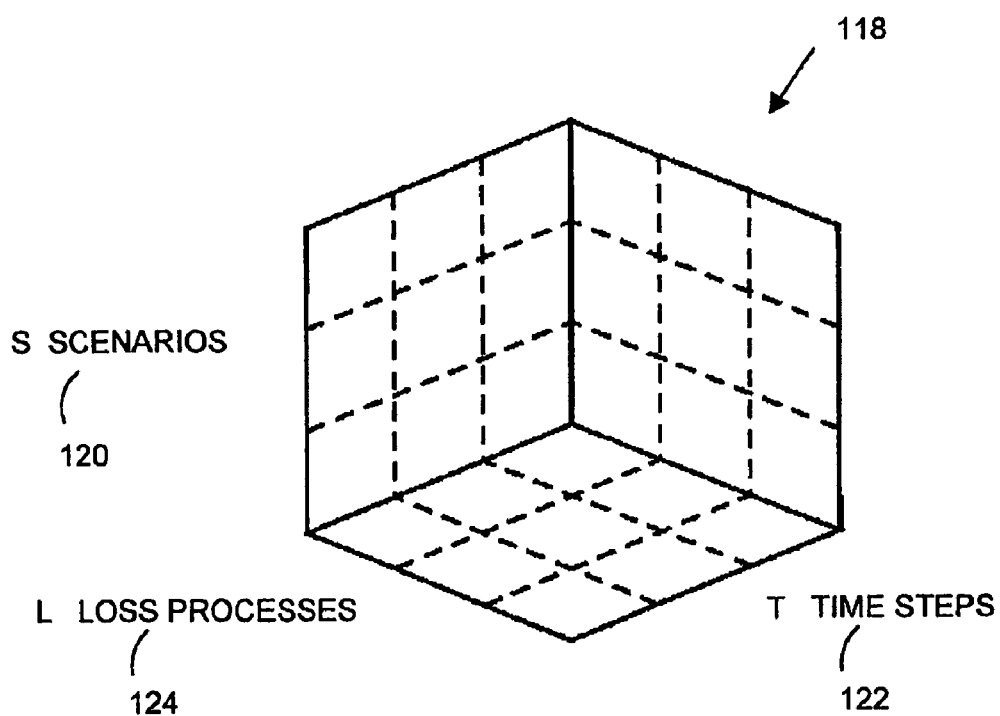
FIG. 3 is a diagram illustrating a modified MtF Cube for operational risk measurement and management.

The application of the MtF framework to operational risk hinges on developing a variant of the standard MtF Cube for use with reporting hierarchies and loss process data. FIG. 3 illustrates an example of a variant of the standard MtF Cube, shown generally as 118, for use in measuring and managing operational risk. The variant MtF Cube comprises of scenarios 120, time series 122, and loss processes 124. The MtF methodology for operational risk assessment can be summarized by the following seven steps, each of which can be explicitly configured as an independent component of the overall process.

The first four steps build the Mtf Cube:
1. Define the reporting hierarchies and loss processes.
2. Define the scenario paths and time step(s).
3. Define the loss processes.
4. Simulate the loss processes over scenarios and time steps to generate a MtF Cube.

The next three steps apply the MtF Cube:
5. Map the MtF Cube into loss distributions to produce a loss distribution MtF table.
6. Aggregate the loss distribution MtF table values to produce risk measures and/or statistics.
7. Incorporate loss distribution MtF tables into (other) advanced applications.

A key aspect of the modified MtF Cube methodology for use in operational risk measurement is the addition of Step 1 in which reporting hierarchies and loss processes are defined. Defining loss processes in the MtF framework enables the resulting loss distributions and MtF values to be computed efficiently and consistently.

Figure 4:
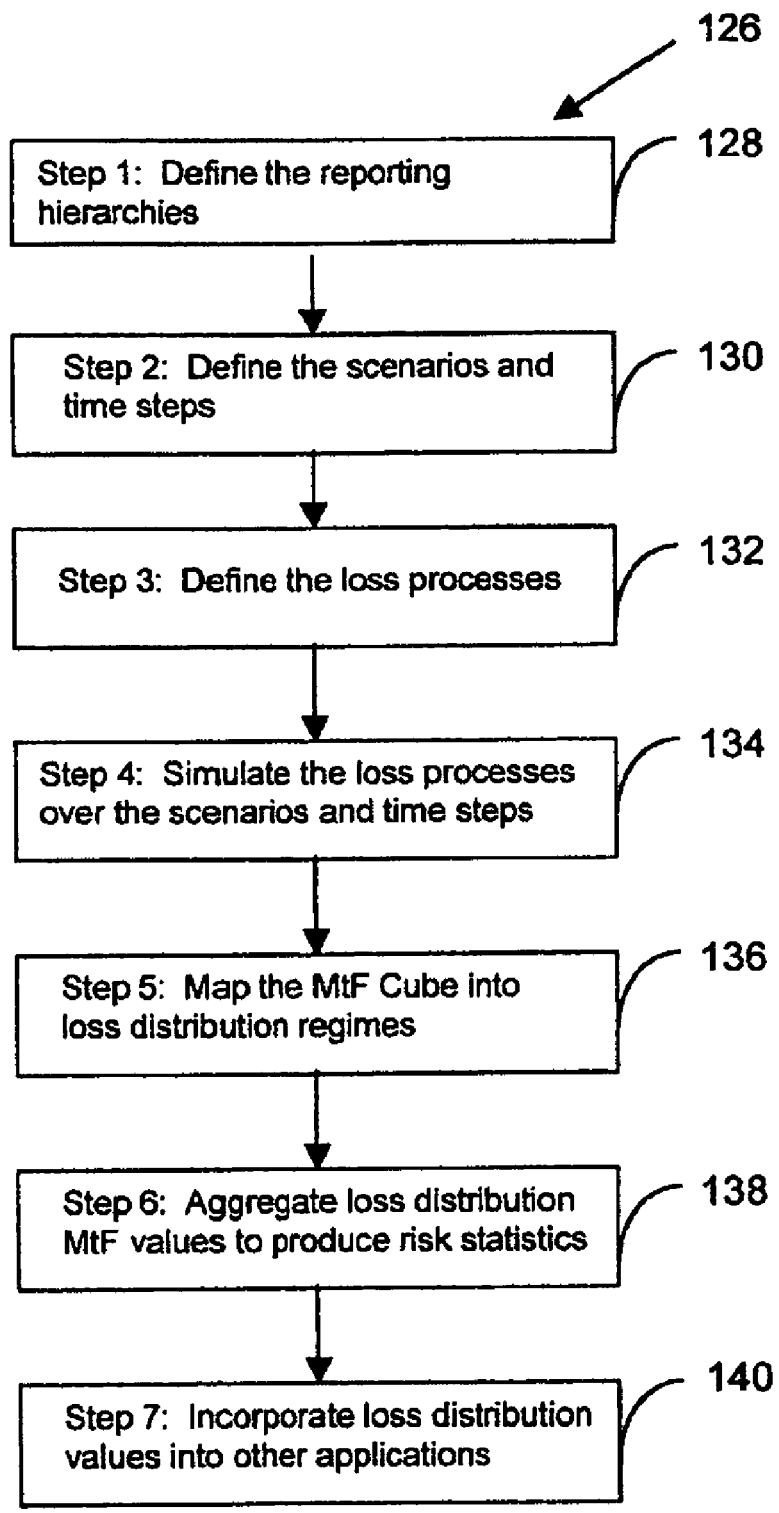
FIG. 4 a flowchart illustrating the steps in a modified MtF methodology for operational risk.

The simulation of the operational risk MtF Cube in Steps 1 to 4 above represents a computationally intensive stage of the process and need be performed only once. These steps represent the pre-Cube stage of MtF processing. In contrast, Steps 5 to 7 represent post-processing exercises, which can be performed with minimal additional processing (Step 5 and Step 6) or slightly more complex processing (Step 7). These steps represent the post-Cube stage of MtF processing. FIG. 4 provides a flowchart illustrating the seven steps of the modified MtF methodology, as applied to operational risk management, explained in further detail below.

The decoupling of the post-Cube stage from the pre-Cube stage is a key architectural benefit of the Mark-to-Future framework. A single risk service may generate a MtF Cube (pre-Cube) that can be distributed to internal business units or departments (post-Cube) for a variety of customized business applications. This generates leverage as a common risk framework and can be widely distributed throughout the financial institution or firm as well as to external organizations for user-specific analyses.

Referring to FIG. 4, the details of this MtF framework and the underlying methodology as it is applied to operational risk are shown generally as 126, and explained in further detail below.

Step 1 (Marked as 128 in FIG. 4): Define Reporting Hierarchies

Reporting hierarchies represent the structure of a firm in a plurality of operational units (e.g. business units, regional offices, trading desks) (to be described in further detail with reference to FIGS. 5, 6 an 7) and loss processes. Defining the reporting hierarchies allows the MtF values for the loss processes to be attributed to a specific operational unit for risk management purposes and/or aggregated to determine the firm-wide operational risk capital. Reporting hierarchies are also used in the definition of the set of loss processes, a key requirement in the use of Mark to Future for operational risk measurement and management.

Step 2 (Marked as 130 in FIG. 4): Define the Scenarios and Time Steps

In the MtF framework, scenarios represent the joint evolution of risk factors through time, and are, thus, the ultimate determinant of future uncertainty. The explicit choice of scenarios is the key input to many analyses. The scenarios may be realizations of the number of loss events per period (i.e. a year) for each operational loss process. Alternatively, scenarios may be realizations of attributes or abstract risk factors affecting the overall loss distribution. For example, a linear combination of loss frequencies may be used, taking into account any correlations between loss events in the two processes? As a further example, parameters of the frequency or severity distributions associated with a loss process, such as. the average frequency over one year, may constitute risk factors, and hence realizations of the parameter values would constitute scenarios. The information generated from the scenarios, such as, the frequency of losses and the total amount of loss for all operational loss processes in the firm, for example, can be used to populate a three-dimensional Mark-to-Future (MtF). Accordingly, scenarios directly or indirectly determine the estimated future distributions of MtF values.

Step 3 (Marked as 132 in FIG. 4): Define the Loss Processes

Reporting hierarchies consist of various loss processes, both internal and external to the firm. A loss process may represent an actual loss process or a statistical (e.g. hypothetical) loss process. Typically, loss processes are defined using the defined reporting hierarchies from Step 1 (marked as 128 in FIG. 4) and data analysis, conducted in calibration engine 50. The MtF Cube is a package of MtF tables, each table corresponding to an individual loss process with realizations across time and scenario 120 (as illustrated in FIG. 3).

Step 4 (Marked as 134 in FIG. 4): Simulate the Loss Processes Over the Scenarios and Time Steps The MtF Cube consists of a set of MtF tables each associated with a given loss process. The cells of the MtF table contain the MtF values of that loss process as simulated over a set of scenarios and a number of time steps. Each loss process has a single loss value on the current risk horizon (e.g. one year) assigned to a plurality of cells in the MtF tables. Determining these loss values is the act of simulation.

Step 5 (Marked as 136 in FIG. 4): Map the MtF Cube into a Hierarchical Portfolio Reporting Structures From the MtF Cube, multiple hierarchical MtF tables can be generated as functions (or combinations) of the MtF tables associated with each loss process. The MtF framework allows a MtF Cube to be generated independently of reporting hierarchy loss events. Any reporting hierarchy or hierarchy regime can be represented by mapping the MtF Cube into static or dynamically changing reporting hierarchies.

Step 6 (Marked as 138 in FIG. 4): Aggregate Loss Distribution MtF Values to Produce Risk Statistics The reporting hierarchy-based MtF table resulting from the mapping of the MtF Cube into a given reporting hierarchy contains a full description of future uncertainty. Each cell of the reporting hierarchy MtF table contains a MtF value for a specific node or level within the reporting hierarchy under a given scenario and time step. The actual risk measures chosen to characterize this uncertainty can be arbitrarily defined and incorporated strictly as post-processing functionality in the post-Cube stage.

Step 7 (Marked as 140 in FIG. 4): Incorporate Loss Distribution Values into Other Applications MtF Cube may serve as input for applications more complex than calculating simple risk measures. The properties of linearity and conditional independence on each scenario and risk time horizon can be used to obtain computationally efficient methodologies. For example, conditional independence within a particular scenario is a powerful tool that allows the MtF framework to incorporate effectively processes such as joint counterparty migration. In addition, reporting hierarchy or loss process MtF cubes may be used as input to a wide variety of scenario-based risk management and reporting hierarchy optimization applications.

The MtF methodology was designed to enable a new generation of risk quantification and management software, and it has a number of key features that make it an excellent choice for operational risk measurement and management purposes. Most importantly for operational risk, the MtF framework is efficient for marginal risk calculation within a reporting hierarchy. For example, in a simulation a position can be reset to zero and the risk statistics recalculated without revaluing the loss processes. Furthermore, it allows multiple reporting hierarchies to be constructed from the same simulation results (the pre-Cube stage occurs once while the post-Cube processing may be repeated). This feature is particularly useful for operational risk managers to allow capital (and other risk measures) to be reported in a number of reporting hierarchies (i.e. business units, classes, geographical locations, process elements, etc.).

Given that credit risk and market risk measurement systems may also utilize the MtF framework, the present invention is capable of being quantified in conjunction with market and credit risk within the same framework, on the same platform, and using the same software architecture. This integration of market, credit and operational risk has significant potential benefits through the use of common risk factors, instruments and risk measurement methodologies.

Reporting Hierarchies

An aspect of the MtF methodology, as applied in accordance with the present invention, is defining the organizational and management structures of a firm into reporting hierarchies. In order to calculate the operational risk capital and related risk measures, it is necessary to first describe a firm's reporting hierarchy in terms of operational units and loss processes. As described earlier with reference to FIG. 1, most firms are organized in a hierarchical structure according to physical or logical structure (e.g. geographic location and lines of business, respectively). Alternatively, reporting hierarchies may be prescribed by regulators or set by a governing body. For example, in the 2001 working paper on Regulatory Treatment of Operational Risk issued by the Basel Committee on Bank Supervision and the Capital Accord, two reporting hierarchies are proposed for use in the financial services industry in determining operational risk capital, namely, business lines and risk classification hierarchies.

Figure 5:
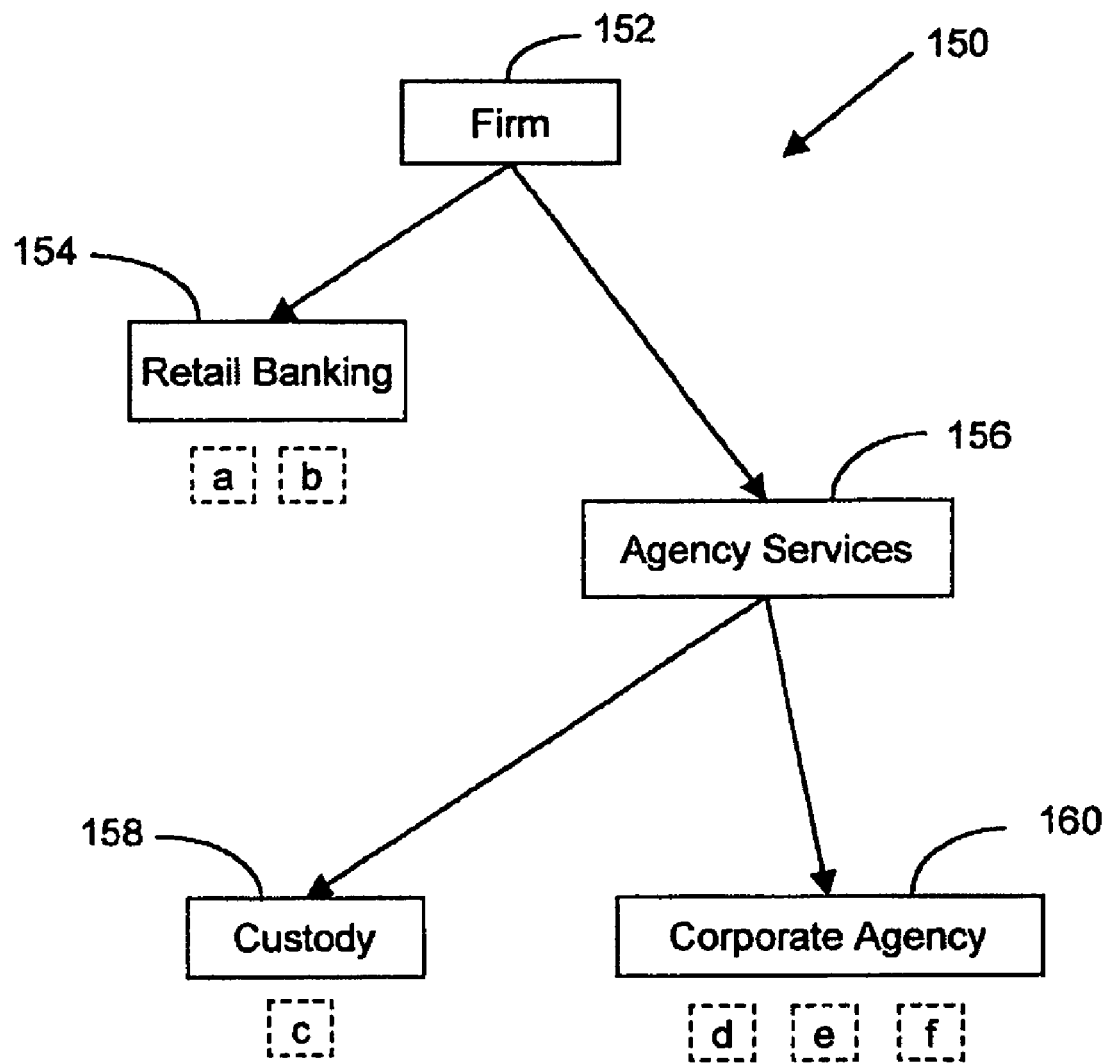
FIG. 5 is a diagram illustrating a first type of reporting hierarchy.
Figure 6:
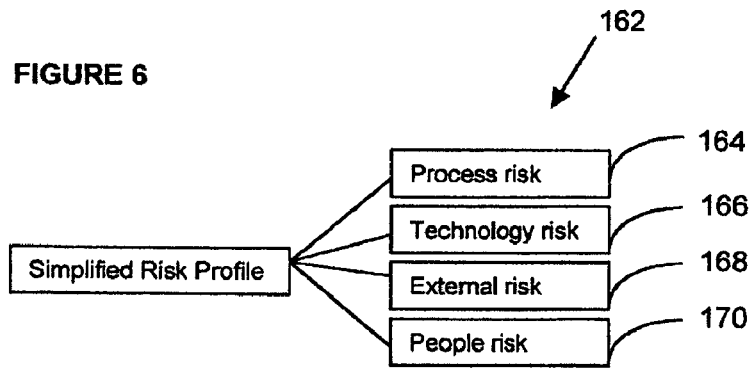
FIG. 6 is a diagram illustrating a second type of reporting hierarchy.
Figure 7:
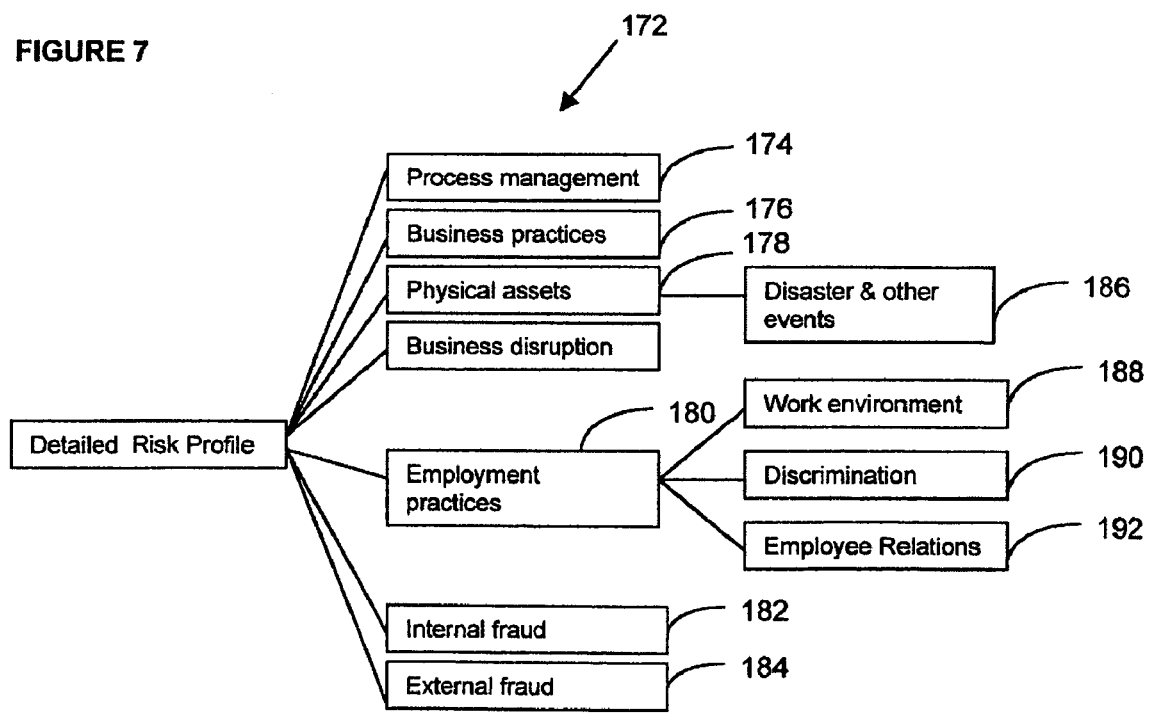
FIG. 7 is a diagram illustrating a third type of reporting hierarchy.

Referring to FIG. 5, an example of a reporting hierarchy in accordance with an embodiment of the present invention is illustrated and shown generally as 150. Reporting hierarchy 150 comprises of operational units 152, 154, 156, 158 and 160. A reporting hierarchy represents the physical or logical structure of a firm and may comprise of a plurality of operational units in a variety of configurations. FIGS. 6 and 7 illustrate two examples of reporting hierarchies defined in accordance with variant embodiments of the present invention. Referring to FIG. 6, a simplified risk class-based reporting hierarchy is shown generally as 162. Reporting hierarchy 162 comprises four operational units 164, 166, 168, and 170. FIG. 7 illustrates a detailed reporting hierarchy 172 comprising a plurality of primary operational units 174, 176, 178, 180, 182, 184, 186, 188, 190 and 192.

In an alternative embodiment of the present invention, system 10 may combine reporting hierarchies to calculate operational risk capital. In principle, the combination of hierarchies is useful to obtain accurate measurements when sources of data are limited, or when "shallow" hierarchies are combined. Other alternate reporting hierarchies may also be defined as required.

Codependence Between Operational Units

Once a reporting hierarchy has been defined, certain additional issues may become easier to articulate. For example, one serious concern is the correlations or more general relationships between losses experienced by diverse operational units, referred to as the codependence between operational units. Codependence between operational units may arise in at least two ways: First, codependence may arise "naturally" as a result of internal or external causal influences which affect distinct loss events. For example, two loss events might be reported in geographically distinct locations, but have a common causal influence, such as an extreme market movement that creates stress and leads to human errors. If the decision has been made to hold capital against such events separately in the two geographical locations, the calculation of the amount of capital to hold will be affected by the correlation between some of the events.

Codependences may also arise "artificially" if a single loss event has effects which are shared throughout the hierarchy of the firm. For example, if the financial impact of a single loss event is shared between two operational units, then that loss is effectively split into two events. However, there is an implied correlation because the events are derived from a single underlying loss (i.e. the events are not independent). The capital held by the two operational units and by operational units higher up the hierarchy depends on this correlation.

The codependent relations between primary operational units can be expressed within the actuarial framework in the form of the joint frequency distribution of all m primary operational units. Suppose operational unit k has $n_k$ events per year, then the required distribution is $h^{(m)}(n_1, n_2, \ldots, n_m)$ with $$p = h^{(m)}(n_1, n_2, \ldots, n_m)$$

equal to the probability of $n_1$ events at the first operational unit $n_2$ events at the second operational unit, and so on. The marginal distributions are determined using the following equation:

$$h_{k(n_k)} = \sum_{n_{j \neq k}} h^{(m)}(n_1, n_2, \ldots, n_m)$$

Because the joint distribution must be specified, the frequency and codependence models are linked in the framework.

Loss Processes

Quantifying operational risk may be challenging because large volumes of input data are required to properly calibrate both loss process distributions and scenario generators for risk factors. The term model is used generally to refer to any item requiring calibration, including loss process frequencies and severities, and scenario generators. The present invention can utilize several different types of input data in the calibration of its models. It is often useful to assign more than one loss process to an operational unit. For instance, if loss processes correspond to distinct physical processes within a firm (e.g. manual and automatic settlement of financial instruments), representing the two loss processes separately is more intuitive and likely to more accurately reflect reality. However, loss processes need not be independent of one another in any sense (e.g. statistical). The following is a description of some examples of various loss processes that may be used in system 10.

Internal loss event data includes, for example, information regarding monetary loss amounts and dates. The Basel Capital Accord regulatory proposals indicate that these types of data should form the basis of all capital calculations under the Advanced Measurement Approach. The proposals also require that operational risk loss event data be collected and maintained in a robust, systematic way using well-defined and documented internal processes.

Indicators are (a time series of) internal or external numeric factors that may influence losses. In accordance with the present invention, indicators are used as predictors of operational risk. For example, if the volume of financial transactions by a firm increases (e.g. introduction of a new product on the market) while the number of staff and availability of new technology decreases (e.g. layoffs or budget cutbacks), the number of loss processes during that period would likely increase. Such numerical correlations between indicators and losses can assist in calibrating loss distributions and operational risk capital. Indicators can also be useful in assessing the frequency and severity of loss events. Since indicators may also serve as risk factors, time series data may contribute to the calibration of scenario generators.

Indicators, both internal and external, also provide static data that are important for developing defensible scaling models. The development of defensible scaling models using indicators allows an organization to scale its internal loss event data according to the operational (e.g. external) market. This ability to scale internal loss event data using indicators is useful when an organization is changing its business focus, expanding, merging and/or operating in inflationary economies. External data (e.g. public domain and consortium) may also need to be scaled before it can applied rationally to the calibration of internal loss distribution models.

"Near-miss" or "close calls" data typically include event dates and monetary exposures. A "near-miss" situation is one that could have resulted in a loss process but failed to occur despite the non-existence of preventive risk avoidance measures. Monetary exposures are loss amounts that may have been experienced had the situation occurred. Near-miss data can be used by organizations to understand the potential for loss events, and to help prevent similar mistakes or occurrences from leading to losses in the future. Additionally, near-misses may be used to augment internal loss data in the calibration of the capital calculation models.

Issues include a set of frequency and approximate monetary amounts of hypothetical loss events (e.g. "what if" risk assessments). Issue data is increasingly becoming the subject of regulatory proposals. As a result, many firms have established practices for collecting this form of data. In many instances, issue data can be used to identify processes within a firm that have a high degree of risk. Issue data may also be useful for assessing the operational risk of new business endeavours, which typically do not have large amounts of loss process data, or to augment the tails of loss distributions. In the risk management industry, issues are often referred to as scenarios. Since these are not necessarily the same as scenarios in the MtF context, we have used the term issue herein.

External public domain loss event data commonly comprises a set of monetary amounts and dates of events experienced by external firms, taken from the public domain. Such loss event data includes, for example, the Zurich IC Squared—Financial Institutions Risk Scenario Trends (FIRST) database. External loss process data from loss data consortia, such as data obtainable from the Multinational Operational Risk Exchange or the British Banker's Association Operational Risk Data Association, for example, may also be used.

Detailed classification of all the above, i.e. the assignment of each datum to one or more nodes or operational units in a reporting hierarchies.

System 10 may utilize various types and forms of data and is not limited solely to the data types described above. Furthermore, in any given situation, not all of the above data may be available or necessary for system 10. It is possible that system 10 may utilize different procedures, for example, if the required output is regulatory capital, the procedure may be different than that for internal economic capital. The Basel Capital Accord proposals do not explicitly specify a procedure for making such decisions, except in the case of the simpler approaches to capital calculation. Nevertheless, the present invention is highly flexible and extensible, and is capable of evaluating and adopting new data sources, models and methodologies as they appear.

In the following sections, two examples of simulations have been provided to illustrate the application of the present invention to operational risk management problems. The first example shows the calculation of operation risk capital at the firm-wide level using an aggregate loss distribution approach. The second example illustrates aggregation of operational risk using the hierarchy in FIG. 5. In both instances, the data utilized is purely hypothetical, and the examples are intended to explain the simulation of operational risk in the Mark-to-Future framework.

EXAMPLE 1

Enterprise-Wide Capital Calculation

In this example, the goal is to calculate operational risk capital at the firm-wide level. It is assumed the subject firm has a reporting hierarchy identical to the hierarchy described in FIG. 5. For ease of understanding, the operational units in reporting hierarchy 150 will be referred by number (e.g. operational unit 152 will have a loss distribution of $f_{152}(z)$). The desired output value is a figure for the annual capital for firm 152 with a one-year risk horizon. A list of internal loss event data and a set of indicator time series data is presumed to be available. The data are associated with a corresponding loss process (a, b, c, d, e, or f) attached to an operational unit directly (154, 158 or 160) or indirectly (156, 152). The loss events can be summed year-by-year to create a series of total annual losses for each operational unit.

It is also presumed that the data collection is consistent with the Basel Capital Accord. In a more complex example, a very different result may be obtained if self-assessment scenarios, external data, near misses, or other inputs were included. Table 2 contains a summary of the input data collected for the entire firm, consisting of six years of losses totaling 316 losses. The number of loss events n for each year in the range 2000-2005 is listed, along with the total loss z, the mean $\mu(x)$ and standard deviation $\sigma(x)$ of the severity (individual loss amounts).

TABLE 2

Summary of input data for firm-wide capital calculation

| Year | n | Z (US$ millions) | $\mu(x)$ (US$ thousands) | $\sigma(x)$ (US$ thousands) |
|------|-----|------|-------|-------|
| 2000 | 64 | 7.55 | 117.9 | 109.6 |
| 2001 | 57 | 6.35 | 111.3 | 106.2 |
| 2002 | 52 | 5.14 | 98.8  | 93.7  |
| 2003 | 55 | 5.29 | 96.1  | 88.0  |
| 2004 | 43 | 3.86 | 89.7  | 78.5  |
| 2005 | 45 | 3.41 | 75.7  | 68.5  |

A Poisson distribution for the frequency of loss, and an empirical distribution for the severity of the loss are selected, requiring both the estimation of the parameters of the distributions and the assessment of the appropriateness of the assumptions based on the assumed input data.

The frequency, whose probability distribution function is given by $$h(n) = \frac{\lambda^n e^{-\lambda}}{n!}$$

is calibrated using a calibration engine (e.g. calibration engine 50 of FIG. 1). The parameter $\lambda$ can be estimated by the average number of events per year over the six years. For this example, the result is 52.67. The Poisson distribution is likely to be appropriate because of the clustering of the number of losses about the mean. This indicates a low variance, much in line with the effects of a Poisson distribution. A more detailed back-testing analysis would have to be carried out to formally determine the appropriateness of the model.

To construct severity distributions, calibration engine 50 uses the given 316 individual loss events, with severity $\{x_i\}$, i=1, 2, . . . , 316. Their broad statistical properties can be deduced from the data in the table, viz mean $\mu$=USD 99.9K and standard deviation $\sigma$=USD 93.6K. Assuming that all previous losses are equally likely to reappear, sampling with replacement, can be conducted directly from the vector of past loss severities. In more formal terms, the implied assumption is that the loss processes are conditionally independent, given n.

Where codependences exist between loss processes, a latent variable model (e.g. the Merton model) may be used to represent a frequency-codependence structure which is equivalent to specifying the joint frequency distribution. The latent variable model is based on covariate normal risk factors, with the loss event frequency determined by a threshold model.

Using a latent variable model approach, a set of m risk indexes $\{y_k\}$ at the operational units are random variables with a covariate normal joint distribution. An event at operational unit k is deemed to have occurred if $y_k$ crosses a threshold $\eta_k$. Using the latent variable model, the marginal distribution of frequencies at each operational unit is a Bernoulli distribution (or binomial of order 1). The distribution has a probability given by:

$$p = \int_k^\infty N(1,0)(x) dx$$

Possible values of N are 0 or 1.

If identical related uncorrelated operational units with probability p are grouped together, a binomial marginal frequency distribution is obtained for the group. When the group has $\upsilon$ members, the maximum frequency is $\upsilon$, and the probability of a single event is p". In the event that p is very small, but $p\upsilon=\lambda$ remains finite, the distribution tends to a Poisson distribution with intensity $\lambda$.

Additionally, generalizations of the covariate normal approach are possible involving rank correlations and marginal distributions of $y_k$ which are not normal. Furthermore, dependencies between different severity modules (basic risk) can be handled by the MtF framework in the present invention.

Based on the assumption that the loss processes are conditionally independent, the annual distributions can be determined as follows:

$$z = \sum_{i=1}^n \hat{x}_i$$

where $\{\hat{x}_i\}$ is a sample (with replacement) of size n from the input data $\{x_i\}$. Note that an explicit choice was made not to fit a smooth parametric model to the data to obtain the annual loss distribution, but to simple resample the input data.

Having determined and calibrated the distributions, a scenario generator module (e.g. scenario generator 70 of FIG. 1) creates scenarios for the input data. First, N is equal to 1000 scenarios (i.e. 1000 simulated years are created). This results in 1000 scenarios for one quantity: the number of events, firm-wide, n. For every scenario on n, an annual loss is generated using the selected actuarial model, with a different sample of $\{\hat{x}_i\}$. With 1000 scenarios, there will be 1000 samples of annual losses (with different values of n). This is the way that the most simulation-based aggregation methods work in market and credit risk systems.

A simulation engine (e.g. simulation engine 80 of FIG. 1) utilizes the selected actuarial model where the annual loss z is not a single loss caused by a single event, but rather is the result of the aggregation of a number of losses. For example, where in a particular year, there are n events that each cause a loss and have monetary values given by:

$$x_i, i = 1, \ldots, n$$

then $$z = \sum_{i=1}^n x_i$$

Understanding the composition of z is facilitated by viewing both x and n as random variables. Thus x has a distribution g such that $$dp = g(x)dx$$

is the conditional probability of experiencing a loss with value in the range [x, x+dx] given that an event has occurred. Event n has a distribution h such that $$p_n = h(n)$$

is the probability of experiencing n loss events in a year. When no operational risk events have occurred $p\neq 0$. In actuarial terms, x is the "severity" of an event, g is the "severity distribution", n is the "frequency", and h is the "frequency distribution" of the operational unit.

In preferred embodiments of the invention, system 10 calculates the loss distribution $f_k(x)$ for each operational unit (e.g. 152, 154, 156, 158 and 160 of FIG. 5) in a consistent manner. Generally, loss distribution $f_k(x)$ is the probability that a loss of magnitude x will occur over a specified period (e.g. one year) in operational unit k. The annual loss distribution may be written as follows:

$$f(z) = \sum_{n=0}^\infty h(n) g^{(n)}(z)$$

where $g^{(n)}$ is the distribution of annual losses, given that there were precisely n events.

The actuarial model approach is advantageous when used in operational risk applications because it is operable when the number of events n is small. Although the estimation of h is affected when there is a limited number of years of data, the actuarial model approach is generally more ready to accept assumptions about h. Principal among these assumptions is that the independent events have a Poisson distribution, as follows $$h(n) = \frac{\lambda^n e^{-\lambda}}{n!}$$

which has a single parameter $\lambda$, the average number of events per year. Another choice is the negative binomial distribution $$h(n) = \binom{\alpha+n-1}{n}\left(\frac{1}{1+\beta}\right)^\alpha \left(\frac{\beta}{\beta+1}\right)^n$$

with $\alpha>0$, $\beta>0$. It is interesting to note that the negative binomial distribution can be derived as a mixture of Poisson distributions with different frequencies $\lambda$. The negative binomial distribution is obtained when $\lambda$ has a gamma distribution. The above equation represents a process where there are expected to be $\bar{\lambda}=\alpha\beta$ loss events per year, however there can be more or less than this number. The standard deviation of the event frequency is given by $\beta\sqrt{\alpha}$.

Additionally, the annual loss distribution equation may be exploited to derive the statistical properties of f from the properties of g and h. The expected value and variance of g and h can be written as follows:

$$E_g(x)=\mu_x, \text{var}_g(x)=\sigma_x^2,$$

$$E_h(n)=\mu_n, \text{var}_h(n)=\sigma_n^2$$

The expected value of x over $g^{(n)}$ is $n\mu_x$, and the variance is $n\sigma_x^2$. Thus, the expected value of z over f is, $$Ef(x) = \sum_n h(n) n \mu_x = \mu_n \mu_x$$

and the second moment of z is $$E_f(z^2) = \sum_n h(n)(n\sigma_x^2 + n^2\mu_x^2),$$

so the variance of z is $$\text{var}_f(z) = \mu_n \sigma_x^2 + \sigma_n^2 \mu_x^2$$

The usual assumption is that the loss events at a given operational unit are conditionally independent given the value of n. Given this assumption $g^{(n)}$ is equal to g convolved with itself n time. This convolution expression can be written iteratively as, $$g^{(n)}(x) = \int_{-\infty}^{\infty} g^{(n-1)}(y-x)g(y)dy$$

$$g^{(0)}(x) = \partial(x),$$

where $\partial$ is the Dirac delta: $\partial(x)=0$ for $x \neq 0$.

The advantage of assuming independence is that there are efficient analytic and numerical techniques for evaluating $g^{(n)}$. The assumption can be relaxed in special cases, at the expense of additional complication.

Each aggregate operational unit also requires a loss distribution. These distributions are created by aggregation of the constituent operational units. Aggregation consists of identifying all of the operational loss processes belonging to the operational unit and all of its descendents in the hierarchy. The annual loss in each scenario for the operational unit is simply the sum of all annual losses in the constituent operational loss processes.

For aggregate operational units 152 and 156, different methods of calculating the loss distributions are required because no operational loss processes are directly attached to these operational units. For example, the information available to operational unit 156 is comprised of all of the data from constituent primary operational units 158 and 160, together with their loss distributions $f_{158}$ and $f_{160}$, and any intermediate results that have been stored in database 40. If losses in operational unit 158 are independent of losses in operational unit 160, then $f_{116}(x)$ may be determined as the convolution of $f_{158}$ and $f_{160}$.

In many situations the losses experienced by the operational units 158 and 160 are related in some fashion. For example, if the hierarchy is based on a line of business reporting structure, operational units 158 and 160 may both experience losses due to the same event, such as a technology failure. This example illustrates a powerful reason to believe that operational risk will be correlated between operational units. In such situations, the loss distributions $f_{158}$ and $f_{160}$ of operation units 158 and 160 are not sufficient. Further information containing the relations between the two operational units will also be required.

Figure 8:
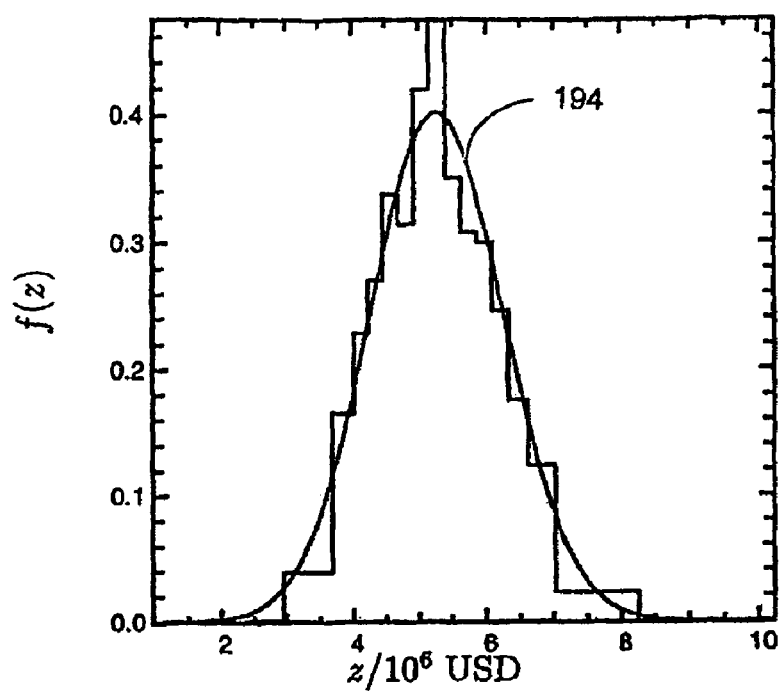
FIG. 8 is a graph modeling an annual loss distribution using an enterprise-wide approach to operational risk capital.

While in this example, only one sample of z is constructed per frequency scenario, but it would also be possible to construct more than one; the results are equivalent for a large enough number of scenarios. FIG. 8 shows the firm-wide annual loss distribution calculated using the assumed input data in Table 2. The results of loss distribution results have been summarized in Table 3. The simulated results in FIG. 8 represent one severity sample per frequency scenario. Simulation curve 194 is formed using a simulation approach with resampling. For comparison, the results are also shown after applying the Central Limit Theorem. The expected loss $\mu$ is given along with the standard deviation $\sigma$. VaR (p) is defined as the difference between the pth percentile and the expected loss.

TABLE 3

| | Firm-wide risk measures using a non-parametric simulation approach | | | | |
|---|---|---|---|---|---|
| Method | $\mu$ USD, millions | $\sigma$ USD, millions | VaR (95%) | VaR (99%) | VaR (99.9%) |
| Resampling | 5.28 | 1.00 | 1.72 | 2.35 | 3.47 |
| Central Limit Theorem | 5.26 | 0.99 | 1.63 | 2.31 | 3.07 |

In this example, the expected loss is 5.26M USD, and the standard deviation is 0.99 M USD. The difference in the two results of risk statistics is largely due to sampling error owing to the small number of scenarios used.

For comparison, since a large number of events per year are expected, the results of a semi-analytic convolution are also provided. In this case, suppose that the severity distribution does not appear to have an ultra-heavy tail, so the Central Limit Theorem can be applied to the convolution. With this approximation the frequencies are simulated as before, and the firm-wide annual loss distribution can be effectively calculated to a high degree of accuracy.

EXAMPLE 2

Capital Calculation in a Hierarchy

In an embodiment of the present invention, system 10 determines distributions for each of the operational loss processes and utilizes this information to derive distributions for the operational units. In the first example, the amount operational risk capital was calculated for the firm as a whole. In the second example the amount operational risk capital is determine for each operational unit within the reporting hierarchy. As will be discussed below, the basis of the capital calculation is scenario input data used in assessing operational risk.

In this example of an embodiment of the present invention, it is assumed that each of the primary operational units 154, 158 and 160 has been through a risk profiling exercise. Table 4 summarizes the scenario data used for this example.

TABLE 4

Summary of Scenario Data

| Operational Unit | Scenario | X (USD) | λ (per year) |
|---|---|---|---|
| 154 | Retail Banking Typical | 100K | 1 |
| | Worst case | 10 M | 0.01 |
| 158 | Custody Typical | 1 M | 0.1 |
| | Worst case | 100 M | 0.01 |
| 160 | Corporate Agency Typical | 200K | 5 |
| | Worst case | 40 M | 0.01 |

The data relates to a fictitious risk profiling of the operational units in FIG. 5. Each primary operational unit has provided a "typical" and a "worst case" scenario for loss events. Each scenario has a loss amount and an estimated average frequency.

Capital for these risks is not necessarily regulated directly, but economic capital may be held by the firm as a buffer. An economic capital figure is also an efficient way of prioritizing the control and mitigation actions. Action plans to control and mitigate the unacceptable risks may be implemented based on the results of the capital calculations.

Using a simulation engine (e.g. simulation engine 80 of FIG. 1), the modified MtF framework is used to calculate the economic capital for the identified risks, and to aggregate the capital to the firm level. For simplicity, the events in each of the six scenarios are assumed to be independent. This means that operational units 154, 158 and 160 each have two separate operational loss processes (i.e. typical and worst case), with each having a separate severity and frequency distribution.

Further, it is assumed that all operational loss processes have a Poisson frequency distribution in accordance with the following equation:

$$h(n) = \frac{\lambda^n e^{-\lambda}}{n!}$$

with intensity equal to the estimated average frequency in Table 4. All severity distributions are modeled as a simple spike at the value of the estimated loss. Either the frequency or severity distributions could be extended to more complex models without altering the remainder of the example.

Figure 9:
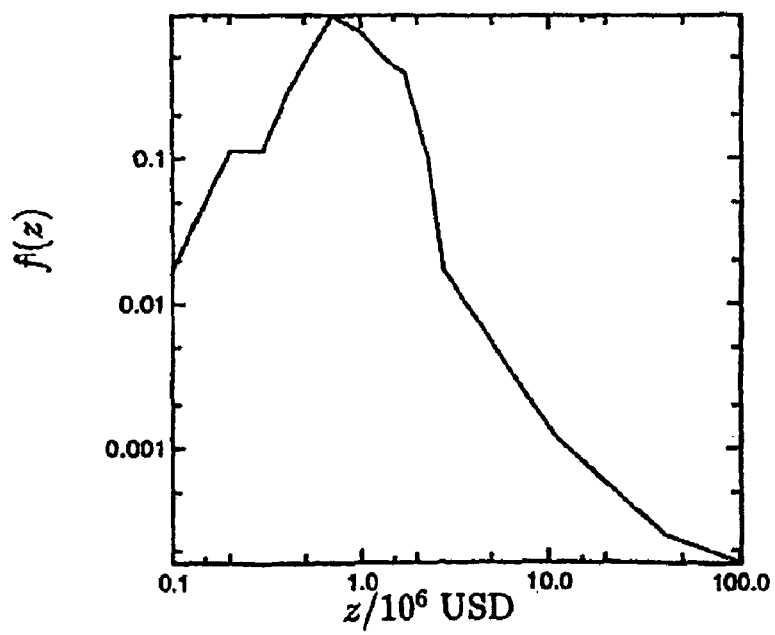
FIG. 9 is a graph modeling an annual loss distribution using a hierarchy-based approach to operational risk capital.

Simulation engine 80 simulates N=10000 scenarios over one time step, with one simulated quantity (frequencies) per operational loss process (six in total), the dimensions of the MtF Cube are 10000×1×6. The results are summarized in Table 5 below and in FIG. 9. The quantities may be estimated using any method as known in the art (e.g. Kernel method) which improves their stability and reliability. Kernel method estimators are useful for applications where the severity distribution is composed of spikes because the cumulative distribution of annual losses is not continuous.

TABLE 5

Summary of Simulation Results

| Unit | μ (USD) | σ (USD) | VaR (99%) (USD) | VaR (99.9%) (USD) | MVaR (99.9%) (USD) |
|---|---|---|---|---|---|
| 152 | 2.75 M | 10.9 M | 68.7 M | 99.2 M | 100% |
| 154 | 2.54 M | 10.8 M | 68.7 M | 99.2 M | 86% |
| 156 | 216K | 1.07 M | 8.18 M | 10.0 M | 14% |
| 158 | 1.11 M | 10.0 M | 49.9 M | 98.9 M | 67% |
| 160 | 1.43 M | 4.13 M | 24.9 M | 40.2 M | 19% |

The marginal Value-at-Risk of an operational unit is the contribution at the margin of that operational unit to the overall Value-at-Risk of the firm, or of the parent of the unit. A useful property of mVaR is that the sum of all values of mVaR for operational units at the same level in the reporting hierarchy (i.e. "child" operational units) would total the mVaR of an operational unit at the next highest level in the reporting hierarchy (i.e. a "parent" operational unit). MVaR contributions are calculated by approximating the partial derivative of the firm-wide VaR with respect to the overall scale of the loss distribution at each operational unit. This is very efficient to calculate within the MtF framework because it does not require a re-simulation. Most of the VaR for the firm can be traced to operational unit 158, hence this operational unit would be deemed to be consuming the most capital. With this information, a business decision can be made as to whether the return on the capital for operational unit 158 is acceptable to the firm as a whole.

In accordance with an embodiment of the present invention, the above examples describe several approaches for performing firm-wide and hierarchy-based measurements of operational risk capital. System 10 may also be used to perform simpler day-to-day models or impact measures that are intended to improve the quality of workflow, reduce losses caused by process failure, change the risk culture the firm, and provide early warning of deterioration in systems or management.

The use of a simulation approach to operational risk overcomes many of the above-mentioned complications. An advantage of using a simulation approach to determine the operational risk capital is that no particular model is mandated for either frequency or severity distributions. Hence, the simulation approach provides the flexibility to specify the precise forms and calibration methods of both distributions, and most particularly the severity distribution.

The simulation approach also accommodates special forms of dependence between frequency and severity distributions. For example, consider an operational unit that experiences only loss events of five amounts: critical, very high, high, moderate and low. If a critical loss occurs, the operational unit will cease operations. This means that after a critical loss, the probability of further losses is zero. If a very high loss occurs, the operational unit manager may obtain insurance or enforce a policy change, thus affecting the probability of future losses at each level or the number of future losses, respectively. The consequence is that $g^{(n)}(z)$ has no explicit functional form. In such instances, a simulation engine (e.g. simulation engine 80 of FIG. 1) would simulate these extreme cases by assigning zero sensitivities to subsequent events.

Lastly, in an alternative embodiment of the present invention, the frequency distribution h(n) can be re-expressed as the distribution of arrival times of an event. For example, the simple Poisson distribution equation can be written in terms of the arrival time t as follows:

$$q(t) = \frac{1}{\lambda} e^{-\lambda t}$$

where q(t)dt is the probability of the next event arriving after t years. The arrival time formulation is particularly convenient for certain applications (e.g. forecasting loss processes), and can help with the specification of the codependence between the different event types.

Writing the joint frequency distribution in terms of arrival times requires $q^{(m)}(t_1, t_2, \ldots, t_m)$ with $$dp = q^{(m)}(t_1, t_2, \ldots, t_m) dt_1 dt_2 \ldots dt_m$$

equal to the probability of the arrival times being in the infinitesimal range of $(t_1, t_2, \ldots, t_m)$. The marginal distribution $q_k$ is given by:

$$q_k(t_k) = \int_{q \atop t_{j \neq k}}^{(m)} (t_1, t_2, \ldots, t_m) dt_1 dt_2 \ldots dt_m$$

Extending the concepts above, arrival time modeling facilitates the inclusion of more complicated ideas in a simulation framework. For instance, instead of $q^{(m)}$ being constant, it could be dependent on the most recent event. An important and convenient mechanism for specifying joint distributions is through the use of copulas. Copulas are a special form of joint distribution of continuous variables, which, in this context, would be used to specify $q^{(m)}$.

While simulation is an approach to estimating the loss distribution based on the calibrated loss distribution, other techniques are available. Specifically, analytic convolution and numerical convolution methods, including for example Fast Fourier Transforms and Panjer's Algorithm, can be employed. These techniques provide computational efficiency, but generally rely on more restrictive assumptions.

The present invention has been described with regard to specific embodiments. However, it will be obvious to persons skilled in the are that a number of variants and modifications can be made without departing from the scope and spirit of the invention defined in the claims appended hereto.

The invention claimed is:

1. A computer-implemented system for measuring and managing operational risk, comprising a processor and a memory, wherein the computer-implemented system comprises:
   (a) a database stored in the memory, wherein operational risk data is stored therein, wherein said operational risk data comprises loss, and wherein said operational risk data is associated with one or more operational units;
   (b) wherein the processor executes instructions to implement a first calibration engine coupled to said database, wherein said calibration engine calibrates loss process distributions, and estimates a plurality of loss process attributes,
      wherein said loss process distributions are calibrated by fitting one or more models for said loss process distributions to said loss data to generate calibrated loss process distributions,
      wherein each of said one or more models comprises a distribution functional form, and
      wherein said calibrated loss process distributions comprise one or more distribution functional forms and parameters therefore;
   (c) wherein the processor executes instructions to implement a second reporting hierarchy engine coupled to said database, wherein said reporting hierarchy engine associates each of said calibrated loss process distributions to said one or more operational units;
   (d) wherein the processor executes instructions to implement a third simulation engine connected to said calibration engine for performing simulation-based computations, wherein said third simulation engine is configured to simulate said calibrated loss process distributions over a plurality of scenarios to generate a loss distribution for each of said one or more operational units,
      wherein said loss distribution generated for each of said one or more operational units comprises estimates of future loss events,
      wherein said plurality of scenarios comprises said plurality of loss process attributes; and
   (e) wherein the processor executes instructions to implement a fourth risk engine coupled to said second reporting hierarchy engine and said third simulation engine for computing at least one risk measure using said loss distribution generated for one or more operational units, wherein said risk measure is a measure of operational risk.

2. The system as claimed in claim 1, wherein said risk measure is internal operational risk capital.

3. The system as claimed in claim 1, wherein said risk measure is regulatory operational risk capital.

4. The system as claimed in claim 1, further comprising a report generator for representing said risk measures in a report for use in managing operational risk capital.

5. The system as claimed in claim 1, wherein said at least one risk measure comprises one or more risk measures selected from the group consisting of: an expected loss, an unexpected loss at a confidence level, a value-at-risk at a confidence level, a marginal value-at-risk at a confidence level, a measure of frequency of loss events, a measure of severity of loss events, and one or more arrival times of loss events.

6. The system as claimed in claim 1, wherein said loss process distributions comprise joint frequency distributions that define a codependence between operational units, and wherein the one or more models for said loss process distributions comprise a latent variable model.

7. The system as claimed in claim 1, wherein said operational risk data comprises one or more data items selected from the group consisting of: a plurality of internal loss events, a plurality of indicators, a plurality of internal near-miss events, a plurality of scenarios, a plurality of external consortium loss events, issues data, and a plurality of external public domain loss events.

8. The system as claimed in claim 1, wherein said calibration engine is further configured to calculate a level of fit of said one or more loss models to said loss data.

9. The system as claimed in claim 1, wherein said one or more models for said loss process distributions comprises a frequency distribution model and a severity distribution model, wherein said frequency distribution model is represented by at least one of a parametric distribution or a non-parametric distribution, and wherein said severity distribution model is represented by at least one of a parametric distribution or a non-parametric distribution.

10. The system as claimed in claim 1, wherein said one or more models for said loss process distributions comprises a complete loss distribution model.

11. The system as claimed in claim 1, wherein said one or more operational units comprises one or more operational units selected from the group consisting of: business units, geographic locations, reporting lines, industries, regulatory requirements, generic organizational units, instruments and risk classes.

12. The system as claimed in claim 1, wherein at least two loss distributions are generated for one or more operational units, and wherein said computing comprises aggregating said at least two loss distributions generated for one or more operational units to compute said at least one risk measure.

13. A method of measuring and managing operational risk within a firm, wherein a computer processor executes instructions of the method, the method comprising:
  defining by the processor a plurality of reporting hierarchies, wherein said reporting hierarchies are composed of operational units;
  associating by the processor operational risk data to one or more of said operational units, wherein said operational risk data comprises loss data;
  calibrating by the processor loss process distributions and estimating a plurality of loss process attributes,
    wherein said calibrating comprises fitting one or more models for said loss process distributions to said loss data to generate calibrated loss process distributions,
    wherein each of said one or more models comprises a distribution functional form, and
    wherein said calibrated loss process distributions comprise one or more distribution functional forms and parameters therefor;
  defining a plurality of scenarios, wherein said plurality of scenarios comprises said plurality of loss process attributes;
  simulating said calibrated loss process distributions over a plurality of scenarios to generate a loss distribution for each of said one or more operational units,
    wherein said loss distribution generated for each of said one or more operational units comprises estimates of future loss events;
  storing loss data associated with said loss distribution generated for one or more operational units in a storage medium; and
  producing at least one risk measure using said loss distribution generated for one or more operational units,
    wherein said risk measure is a measure of operational risk.

14. The method as claimed in claim 13, wherein loss data associated with said distribution generated for one or more operational units is stored in a mark-to-future Cube.

15. The method as claimed in claim 13, wherein said risk measure is internal operational risk capital.

16. The method as claimed in claim 13, wherein said risk measure is regulatory operational risk capital.

17. The method as claimed in claim 13, further comprising generating a report, wherein said report represents said risk measures for use in managing operational risk.

18. The method as claimed in claim 13, wherein at least two loss distributions are generated for one or more operational units, and wherein said producing comprises aggregating said at least two loss distributions generated for one or more operational units to produce said at least one risk measure.

* * * * *

UNITED STATES PATENT AND TRADEMARK OFFICE
CERTIFICATE OF CORRECTION

| | | |
|---|---|---|
| PATENT NO. | : 7,778,856 B2 | Page 1 of 1 |
| APPLICATION NO. | : 12/365961 | |
| DATED | : August 17, 2010 | |
| INVENTOR(S) | : Reynolds et al. | |

It is certified that error appears in the above-identified patent and that said Letters Patent is hereby corrected as shown below:

Title page, Item (54) and in the Specification, at Column 1, lines 1 and 2, replace "SYSTEM AND METHOD FOR MEASURING AND MANAGING OPERATIONAL RISK" with -- MEASURING AND MANAGING OPERATIONAL RISK --, In the Claims Column 22, line 64-65, replace "at least one of a parametric distribution or a non-parametric distribution" with -- at least one of a parametric distribution and a non-parametric distribution --, and line 66-67, replace "at least one of a parametric distribution or a non-parametric distribution" with -- at least one of a parametric distribution and a non-parametric distribution --.

Signed and Sealed this
First Day of April, 2014

Michelle K. Lee
*Deputy Director of the United States Patent and Trademark Office*